UNITED STATES PATENT OFFICE.

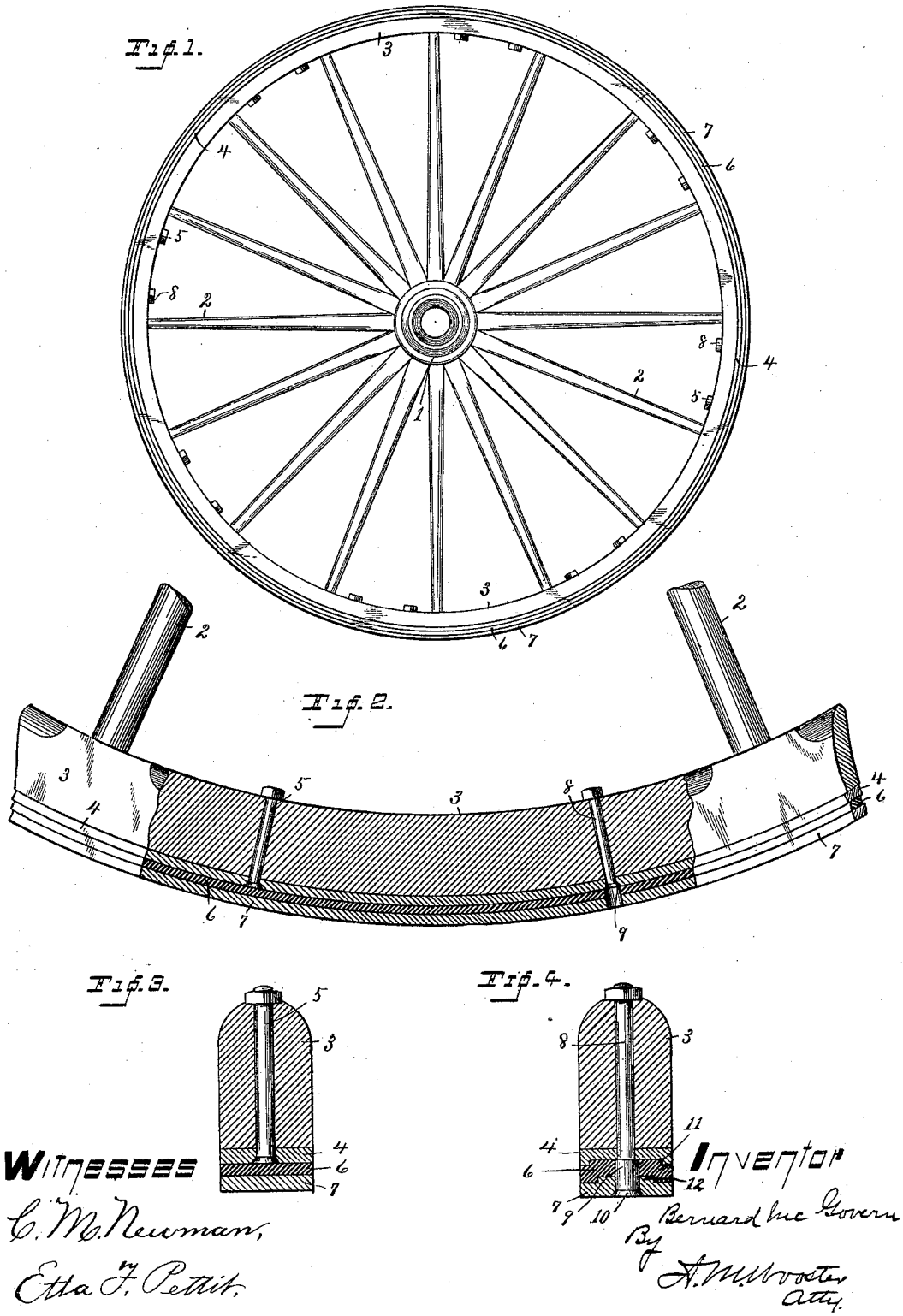

BERNARD McGOVERN, OF NORWALK, CONNECTICUT, ASSIGNOR TO MARY E. McGOVERN, OF SAME PLACE.

WAGON-WHEEL.

SPECIFICATION forming part of Letters Patent No. 420,663, dated February 4, 1890.

Application filed May 31, 1889. Serial No. 312,764. (No model.)

*To all whom it may concern:*

Be it known that I, BERNARD MCGOVERN, a citizen of the United States, residing at Norwalk, in the county of Fairfield and State of Connecticut, have invented certain new and useful Improvements in Wagon-Wheels; and I do hereby declare the following to be a full, clear, and exact description of the invention, such as will enable others skilled in the art to which it appertains to make and use the same.

My invention relates to the manufacture of wagon-wheels, and has for its object to so improve the construction of the wheel that stretching of the tire and the tendency of the spokes to become loose in the felly and hub are prevented, the life of the wheel being greatly prolonged and the wagon being caused to ride much easier and to be practically noiseless, the metallic sound made by ordinary wheels, as in crossing a railway-track, being avoided. With these ends in view I have devised the simple and novel construction of which the following description, in connection with the accompanying drawings, is a specification, numbers being used to denote the several parts.

Figure 1 is a side elevation of my novel wheel complete; Fig. 2, an enlarged view of a portion of the felly, partly in section, showing the manner in which my novel wheel is constructed; Fig. 3, a cross-section of the felly, metal tires, and rubber tire on a still larger scale; and Fig. 4 is another form of my invention, in which the details of construction are slightly changed.

I am quite well aware that rubber tires have heretofore been used in the construction of wagon-wheels; but, so far as I am aware, no practical wheel of this class has heretofore been produced, the principal defect being that the wheels were not able to stand the wear and tear of continued use.

My novel wheel is adapted to all classes of wagons, and will be found of the greatest value upon wagons designed for heavy work as well as upon light road-wagons. In the latter use, however, my wheel is particularly valuable on account of its noiseless qualities and the ease with which the wagon rides.

Rubber tires have been found wholly impracticable for road-wagons, as they quickly wear out, and are, moreover, apt to become loose. By my invention I secure all the advantages of a rubber tire, and at the same time produce a wheel that will outwear any other class of wheels of the same weight. As a matter of fact, my invention is supplemental to a wheel as ordinarily constructed. It is found in practice that the wearing out of wagon-wheels is the result of the continued succession of blows to which the tires are subjected. The effect of these blows is to cause the tire to stretch. This allows the felly to become loose within the tires and the spokes to become loose both in the fellies and the hubs, the result being that the tire must be reset or the wheel becomes quickly ruined.

Turning now to the drawings, 1 denotes the hub of a wheel; 2, the spokes; 3, the felly; 4, the tire, and 5 the ordinary tire-bolts, which pass through the felly and hold the tire firmly in place. These parts may all be of the ordinary or any preferred construction, the tire being shrunk upon the felly in the ordinary manner.

6 denotes a rubber tire, which is placed outside of the ordinary tire, and 7 a supplemental metallic tire, which is placed outside of the rubber tire, the rubber tire and the supplemental tire being held in position by a series of bolts 8, which pass through both metal tires, the rubber tire, and the felly, this series of bolts being entirely independent of the usual bolts by which the tire is held in place. In practice I preferably provide shoulders 9 on these bolts, which engage the ordinary tire in the usual manner, thereby taking the place of an equal number of the ordinary tire-bolts. The bolts 9 may be straight beyond the shoulders, as shown in Fig. 2, or may be provided with an additional shoulder 10, as shown in Fig. 4. This shoulder engages the supplemental tire in the same manner that the shoulders of the ordinary tire-bolts 5 engage the ordinary tires. In practice, however, I have found that this shoulder is not necessary.

In my improved wheel it is only necessary to hold the supplemental tires against lateral movement, which is done perfectly by the form of bolt illustrated in Fig. 2. If preferred, tire 4 may be provided with a groove 11. Supplemental tire 7 may be made thickest at its central portion, as at 12, and the rubber tire, which goes between them, may be shaped to correspond with said groove and said thickened portion, as is clearly shown in Fig. 4. It is believed that one reason why wheels of this class have not been heretofore produced is owing to the impossibility of getting the supplemental tires in place over the rubber tires, heating and shrinking on in the ordinary manner being of course impossible.

In order to make my novel wheel and to place the supplemental tire firmly in place without injury to the rubber tire, I have devised a novel machine by which the outer tire is compressed on cold. This machine, however, forms no portion of my present invention.

It will be seen that my improvements weaken the wheel nowhere, but strengthen it everywhere. The rubber tire in fact cushions the wheel proper and prevents stretching of the tire, and the supplemental tire protects the rubber tire against injury in use, the rubber tire at the same time acting as a cushion for the supplemental tire and preventing it from becoming stretched by the continued series of blows it is compelled to withstand, as is invariably the case with a tire placed upon a rigid felly. It is found in practice that the durability of a wheel constructed in this manner is beyond all precedent.

Having thus described my invention, I claim—

1. A vehicle-wheel consisting of hubs, spokes, felly, and metal tire, a rubber band or tire outside of said metal tire, a second metal tire outside of said rubber tire, and two series or sets of bolts, the bolts of one set passing through the felly and inner metal tire and the bolts of the other set passing through the felly and all three tires.

2. A vehicle-wheel consisting of hubs, spokes, felly, and metal tire, a rubber band or tire outside of said metal tire, a second metal tire outside of said rubber tire, and two series or sets of bolts, the bolts of one set passing through the felly and inner metal tire and the bolts of the other set passing through the felly and all three tires, the last-named bolts having enlarged outer portions forming shoulders to engage and hold the inner metal tire.

In testimony whereof I affix my signature in presence of two witnesses.

BERNARD McGOVERN.

Witnesses:
A. M. WOOSTER,
ETTA F. PETTIT.